US010601905B2

(12) United States Patent
Bregman et al.

(10) Patent No.: US 10,601,905 B2
(45) Date of Patent: Mar. 24, 2020

(54) PRIORITY SWITCHING BASED ON RESOURCE USAGE PATTERNS

(71) Applicant: Red Hat Israel, Ltd., Raanana (IL)

(72) Inventors: Arie Bregman, Gan Yavne (IL); David Sariel, Holon (IL)

(73) Assignee: Red Hat Israel, LTD., Raanana (IL)

( * ) Notice: Subject to any disclaimer, the term of this patent is extended or adjusted under 35 U.S.C. 154(b) by 111 days.

(21) Appl. No.: 16/041,299

(22) Filed: Jul. 20, 2018

(65) Prior Publication Data

US 2020/0028895 A1 Jan. 23, 2020

(51) Int. Cl.
*H04L 29/08* (2006.01)
*G06F 9/50* (2006.01)

(52) U.S. Cl.
CPC .......... *H04L 67/1004* (2013.01); *G06F 9/505* (2013.01); *G06F 9/5083* (2013.01)

(58) Field of Classification Search
CPC .................................................. H04L 67/1004
See application file for complete search history.

(56) References Cited

U.S. PATENT DOCUMENTS

| | | | | |
|---|---|---|---|---|
| 5,731,984 A * | 3/1998 | Ullmann | .......... | G01R 31/31912 702/108 |
| 6,502,148 B1 * | 12/2002 | Krum | ....................... | H04L 67/10 709/208 |
| 6,539,445 B1 * | 3/2003 | Krum | .................. | H04L 67/1031 709/208 |
| 7,334,032 B2 * | 2/2008 | Chambliss | ............ | G06F 3/0617 709/203 |
| 7,693,991 B2 * | 4/2010 | Greenlee | ................. | G06F 9/505 709/223 |
| 9,600,337 B2 * | 3/2017 | Karaje | ................ | G06F 13/1642 |
| 9,935,812 B1 * | 4/2018 | Cirne | .................. | G06F 11/3409 |

(Continued)

FOREIGN PATENT DOCUMENTS

| | | |
|---|---|---|
| AU | 2018100381 A4 | 5/2018 |
| KR | 20150089665 A | 8/2015 |

OTHER PUBLICATIONS

Suri, P.K., et al., "Simulator for Priority based Scheduling of Resources in Cloud Computing," Jul. 2016, http://pdfs.semanticscholar.org/3c1e/4cbfced58d5021b8444a1ce9ef9c18a78629.pdf.

(Continued)

*Primary Examiner* — Ondrej C Vostal
(74) *Attorney, Agent, or Firm* — Kilpatrick Townsend & Stockton LLP

(57) ABSTRACT

A processing device in a system can allocate builds to execute jobs across servers in a distributed server environment such as a continuous integration (CI) or continuous deployment (CD) server environment, determine workload patterns, and store a workload pattern vector including a resource usage pattern for the builds and the servers. The processing device can provide an interface that allows a user to switch priorities of user-owned builds in server environments, even after execution of the jobs has begun. The user's ability to prioritize or reprioritize builds is limited to user-prioritizable builds as determined based on the resource usage patterns of the builds running the jobs. The user can thus prioritize some user-owned builds without adversely affecting builds of other users.

20 Claims, 6 Drawing Sheets

(56) References Cited

U.S. PATENT DOCUMENTS

| | | | | |
|---|---|---|---|---|
| 2004/0098499 A1* | 5/2004 | Tamai | ............... | H04L 67/1008 709/232 |
| 2004/0139191 A1* | 7/2004 | Chambliss | ............ | G06F 3/0617 709/224 |
| 2005/0053009 A1* | 3/2005 | Denby | ............... | H04L 41/0631 370/250 |
| 2006/0069776 A1* | 3/2006 | Shim | ............... | H04L 67/1008 709/225 |
| 2011/0125547 A1* | 5/2011 | Brdiczka | ............... | G06Q 10/06 705/7.26 |
| 2016/0094643 A1* | 3/2016 | Jain | ............... | H04L 45/44 709/226 |
| 2017/0109907 A1* | 4/2017 | Hamedani | ............... | G06T 9/00 |
| 2018/0143856 A1 | 5/2018 | Du et al. | | |
| 2018/0189110 A1* | 7/2018 | Venkatesh | ............ | G06F 15/8092 |
| 2019/0334786 A1* | 10/2019 | Dutta | ............... | H04L 41/142 |

OTHER PUBLICATIONS

Thamsen, L. et al., "Scheduling Recurring Distributed Dataflow Jobs based on Resource Utilization and Interference," Technische Universitat, 2017 http://www.user.tu-berlin.de/lauritz.thamsen/assets/texts/ThamsenRabierSchmidtRennerKao_2017_SchedulingRecurringDistributedDataflowJobsBasedOnResourceUtilizationAndInterference.pdf.

"Resource Aware Scheduler," Apache Software Foundation, 2015, http://storm.apache.org/releases/1.2.1/Resource_Aware_Scheduler_overview.html.

"Priority Sorter Plugin," Jan. 23, 2018 https://wiki.jenkins.io/display/JENKINS/Priority+Sorter+Plugin.

\* cited by examiner

Job i, build j:

Slave 1: time[t1,t2] CPU:2, mem:20Mb, net:300MB/s .time:[tn,tm] CPU:2, mem:100Mb, net:200MB/s, IO:260iops Slave 2: time[t1,t2] CPU:2, mem:220Mb, net:300MB/s .time:[tn,tm] CPU:2, mem:100Mb, net:10MB/s, IO:270iops

.

.

.

Slave N: time[t1,t2] CPU:2, mem:200Mb, net:300MB/s .time:[tn,tm] CPU:2, mem:100Mb, net:20MB/s, IO:280iops

PRIORITY SWITCHING BASED ON RESOURCE USAGE PATTERNS

TECHNICAL FIELD

The present disclosure relates generally to distributed processing such as that used for continuous integration (CI) or continuous deployment (CD) of computer program code. More specifically, but not by way of limitation, this disclosure relates to providing a user interface for managing the priority of builds in a distributed processing environment, where the user interface is continuously tailored to current usage patterns.

BACKGROUND

In CI and CD server environments, a user can "own" multiple builds in a scheduled builds queue. A "build" is an execution of a specific job such as an application test or an application update. Once a user's builds have been submitted for execution and prioritized, the user cannot change the scheduled priority of her or her builds unless the user "owns" all of the builds in the system, because such a change might adversely affect other users. For example, if the user were to unknowingly change the priority of his or her own builds so that a job requiring four slave servers is newly prioritized more highly than a job requiring two slave servers, other users' builds in progress would be adversely impacted because computing resources would suddenly become more constrained.

DETAILED DESCRIPTION

Figure 1:
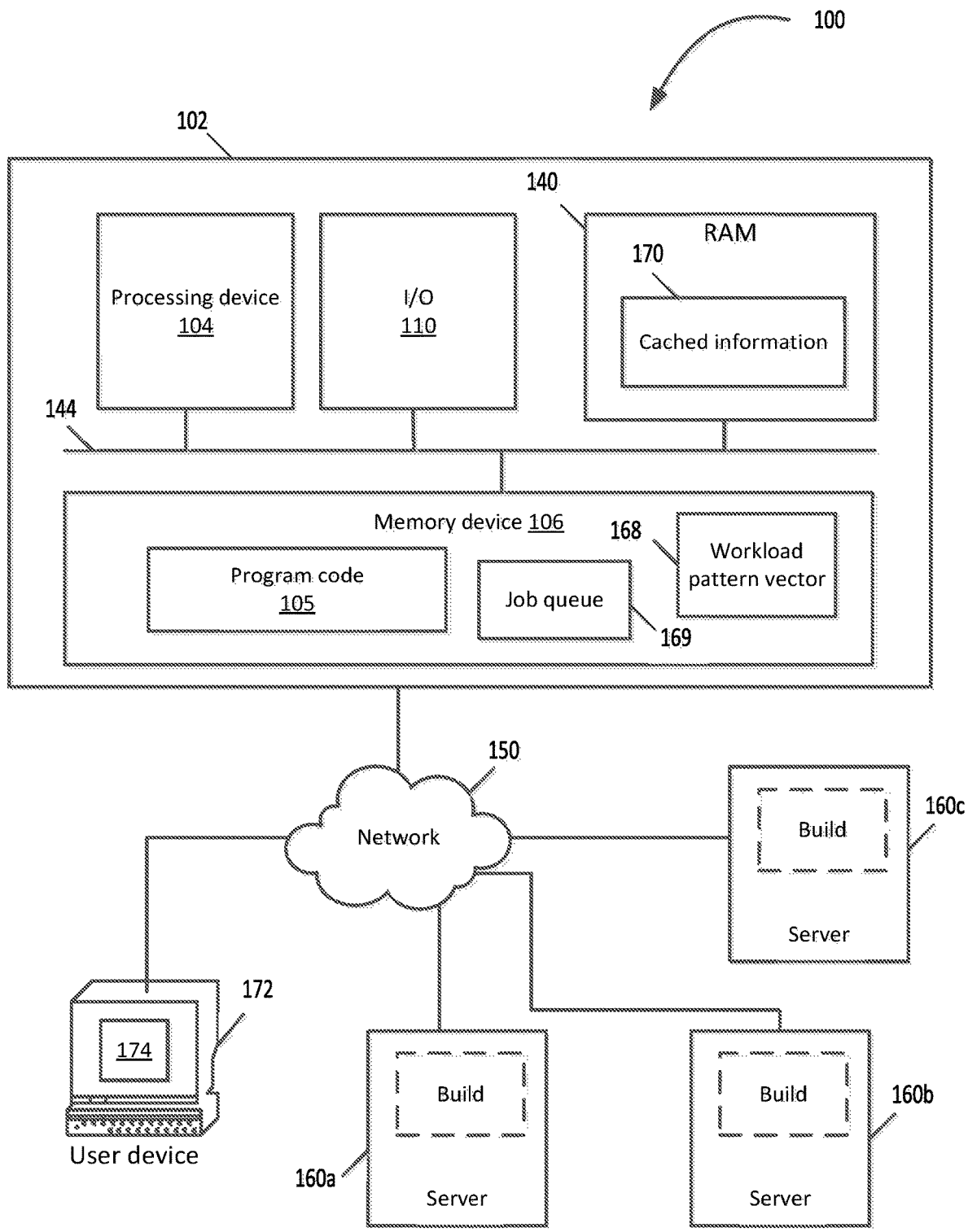
FIG. 1 is a block diagram of an example of a system that provides priority switching based on resource usage patterns.

In CI and CD server environments, a user can "own" multiple builds in a scheduled builds queue. A "build" is an execution of a specific job. A "job" is a set of pre-defined instructions for accomplishing some task, such as an application test or an application update. In typical CI and CD server environments, once a user's builds have started execution and been prioritized, the user cannot change the scheduled priority of her or his builds, because such a change might adversely affect other users' builds. In order to allow a user to prioritize or reprioritize builds during execution, it may be desirable to provide a mechanism that confines user-prioritization to situations where fairness to other users can be maintained.

Some examples of the present disclosure overcome one or more of the issues mentioned above by providing such a mechanism in the form of an interface that allows a user to switch his or her build priorities in any server environment where builds are distributed across servers, even after execution has begun. The user's ability to re-prioritize builds is limited to a group of builds as determined based on resource usage patterns of servers to which the builds are allocated. The builds in this group may be referred to herein as "user-prioritizable" builds. The interface displays at least these user-prioritizable builds in progress, but optionally may also display other builds in progress.

Some examples of the present disclosure avoid processing disruptions in a server system while also providing the ability to a user make prioritization changes after the processing of jobs has begun. As an example, a processing device in a system can allocate jobs across servers. The jobs involve execution of multiple builds on the servers. The processing device can also store a workload pattern vector that includes resource usage patterns corresponding to the jobs and the builds. Each resource usage pattern indicate how computing resources are consumed by a server to execute a respective build from among the builds. The processing device can determine, using the workload pattern vector, statistical indicators corresponding to the jobs. Each respective statistical indicator represents a statistical measure of resource usage for the builds for a respective job. The processing device can then display, based at least in part on the statistical indicator, a list of builds including at least some user-prioritizable builds from among the builds in process. The user can provide input directed to prioritizing one or more of the user-prioritizable builds and the processing device can prioritize in response to the user input.

In some examples, a processing device can allocate builds across servers based at least in part on a desired hardware specification for the servers and a number of simultaneous builds permitted on each server. This information can be accessed from a storage device or received through user input. In some examples, the statistical indicator of resource usage is a standard deviation of a median of statistical distance between the resource usage of builds in a set of builds executing each job. As examples, the set of builds can include all builds except the earliest build, or all builds except the two earliest builds, all builds in the system, or a combination of any or all of these. The statistical distance can be determined based on sparse data from the resource usage pattern of the workload pattern vector. Builds can be determined to be user-prioritizable and displayed as such by comparing the standard deviation of the median of statistical distance to a threshold value.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a system 100 that provides priority switching based on resource usage patterns. More specifically, the system 100 includes a computing device 102. Examples of the computing device 102 can include a server, laptop computer, desktop computer, or any combination of these. The computing device 102 can execute computer program code instructions, or software as defined below, which causes computing device 102 to perform the tasks of what is known as a master server in a CI or CD server environment, though at least some of the examples in this disclosure can be used in any distributed build server environment. CI and CD server environments are only examples. Software can include computer-readable instructions that are executable by a processing device 104, such as program code instructions 105. The system can be programmed in any suitable programming language, such as Java, C++, C, Python, or any combination of these.

In FIG. 1, computing device 102 includes a processing device 104, memory device 106, an input/output (I/O) module or modules 110, and a random-access memory (RAM) 140. A bus or interconnect 144 is also provided to allow for inter- and intra-device communications using, for example, I/O module 110. I/O module 110 can include a network interface (not shown), which in turn communicates with network 150.

Still referring to FIG. 1, network 150 connects computing device 102 to servers 160a, 160b, and 160c, to which builds for executing jobs are distributed by computing device 102. In a typical CI or CD environment, servers 160a-160c might be referred to as "slave servers" or "slaves." Only three such servers are shown in FIG. 1 for clarity of illustration, although many such servers can be present. Each "slave" includes a processing device, a memory device, I/O, and other components similar to computing device 102 and other typical computing devices.

In the example of FIG. 1, a workload pattern vector 168 including resource usage patterns for servers 160a-160c is stored in the file system of memory device 106. A job queue 169 including the jobs that are distributed in builds to servers 160a-160c is also stored in the file system of memory device 106. In the example of FIG. 1, cached information 170, such as jobs, statistical indicators, lists of builds for display, or other information used by system 100 may be stored in RAM 140. In addition to connecting computing device 102 to servers 160a-160c, network 150 also connects computing device 102 to user device 172, which may be a personal computer, smartphone, tablet computer, or some other type of client device. User input can be received by computing device 102 through user device 172. Additionally, a list of builds 174 can be displayed to a user on user device 172. This list of builds can include user-prioritizable builds and user input directed to prioritizing or reprioritizing builds can be received on user device 172 and forwarded to computing device 102. User input and display functions can alternatively or additionally be provided through peripherals (not shown) locally attached to computing device 102.

Figure 2:
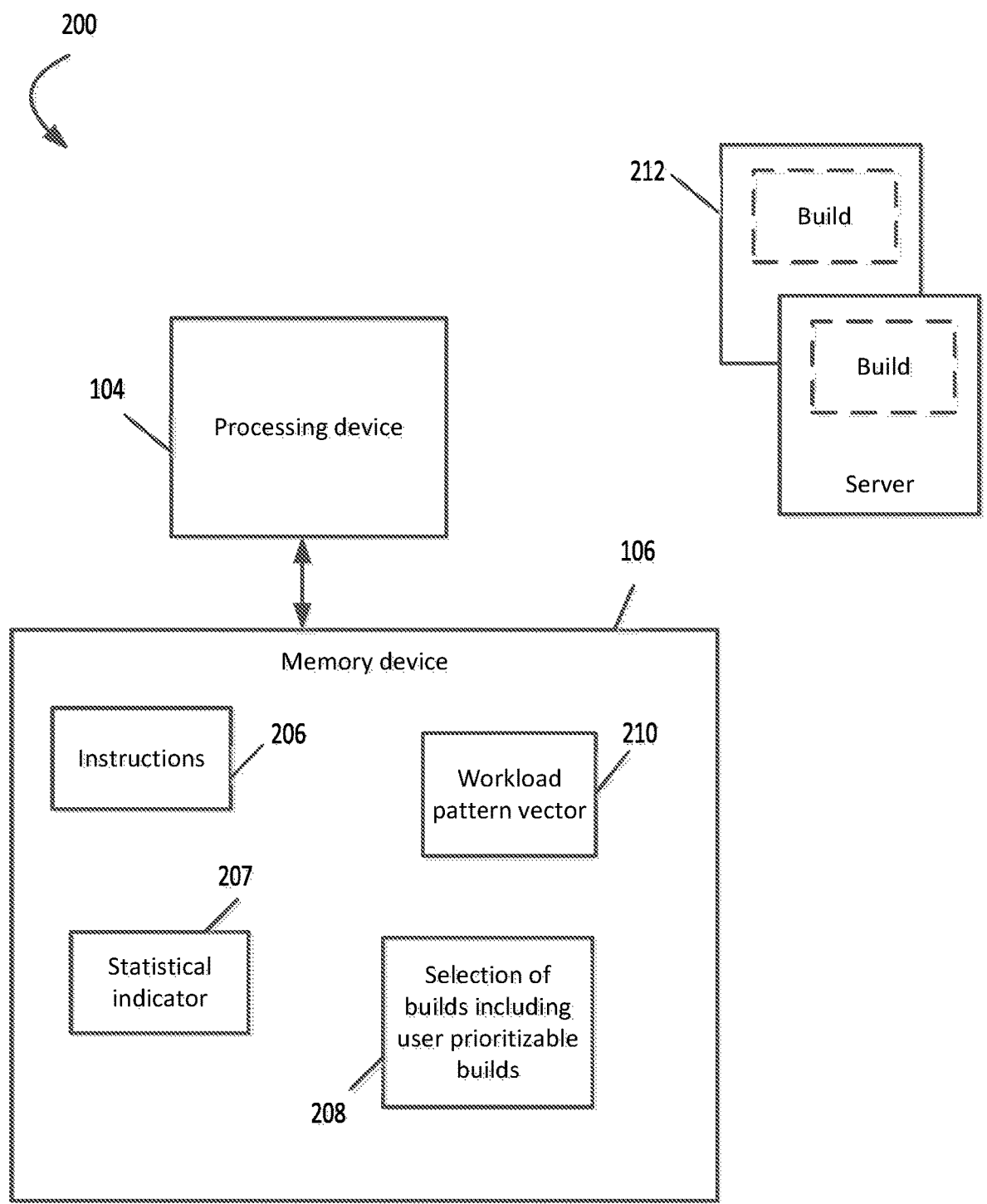
FIG. 2 is a block diagram of another example system that provides priority switching based on resource usage patterns.

FIG. 2 is a block diagram of an example system 200 that provides priority switching based on resource usage patterns. The system 200 includes the processing device 104 that can execute computer program code, also referred to as instructions or program code instructions, for performing operations related to providing priority switching based on resource usage patterns. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, etc. The processing device 104 can execute one or more operations for allocating builds across severs, determining resource usage patterns, storing a workload pattern vector, calculating statistical indicators and displaying lists of builds. The processing device 104 can execute program code instructions 206 stored in the memory device 106 to perform the operations.

Memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 206. A computer-readable medium can include electronic, optical, magnetic, or other storage devices capable of providing the processing device with computer-readable instructions 206 or other program code. Non-limiting examples of the memory device 106 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

Figure 3:
FIG. 3 is an example workload pattern vector as would be used in a system that provides for priority switching based on resource usage patterns according to some aspects.

The memory device 106 can also include one or more files and one or more stored values. For example, memory device 106 can serve as a storage device for one or more statistical indicators 207. A statistical indicator in this example provides a measure of resource usage. Memory device 106 can also serve as a storage device for one or more lists of builds 208, including user-prioritizable builds. The list of builds is typically presented to a user on a user device or a display device (not shown). One or more workload pattern vectors 210 can also be stored locally in memory device 106. A workload pattern vector 210 in some aspects includes at least one resource usage pattern for jobs distributed to servers 212 and an example is shown in FIG. 3, discussed below. Some of the builds for these jobs are listed in the list of builds 208. Although FIGS. 1 and 2 depict a certain arrangement of components for illustrative purposes, other examples can include any number and combination of these components arranged in any suitable configuration.

FIG. 3 shows a portion 300 of a workload pattern vector. The workload pattern vector takes the form of a line of data for each slave, where the lines of data for slaves are grouped by job and build. Portion 500 illustrates the portion of the workload pattern vector for job i, build j. Each line includes period-delineated sections, where each section lists the resources held for a specific time interval. Resources not used at all are not listed. For example, the first period-delineated section for each slave shows a usage pattern between times t1 and t2. In each case, the resources held for this time interval include a number of CPUs used, an amount of memory used, and an amount of network traffic occurring in the time interval. For the time interval between tm and tn in each case, all those resources are held in differing amounts, and additionally some input/output (I/O) resources are held. The I/O resources are given in I/Os per second (iops). To monitor and ascertain these resources, a tool such as a system activity reporter (SAR) can be used, at least for Unix-based and Linux-based servers.

Figure 4:
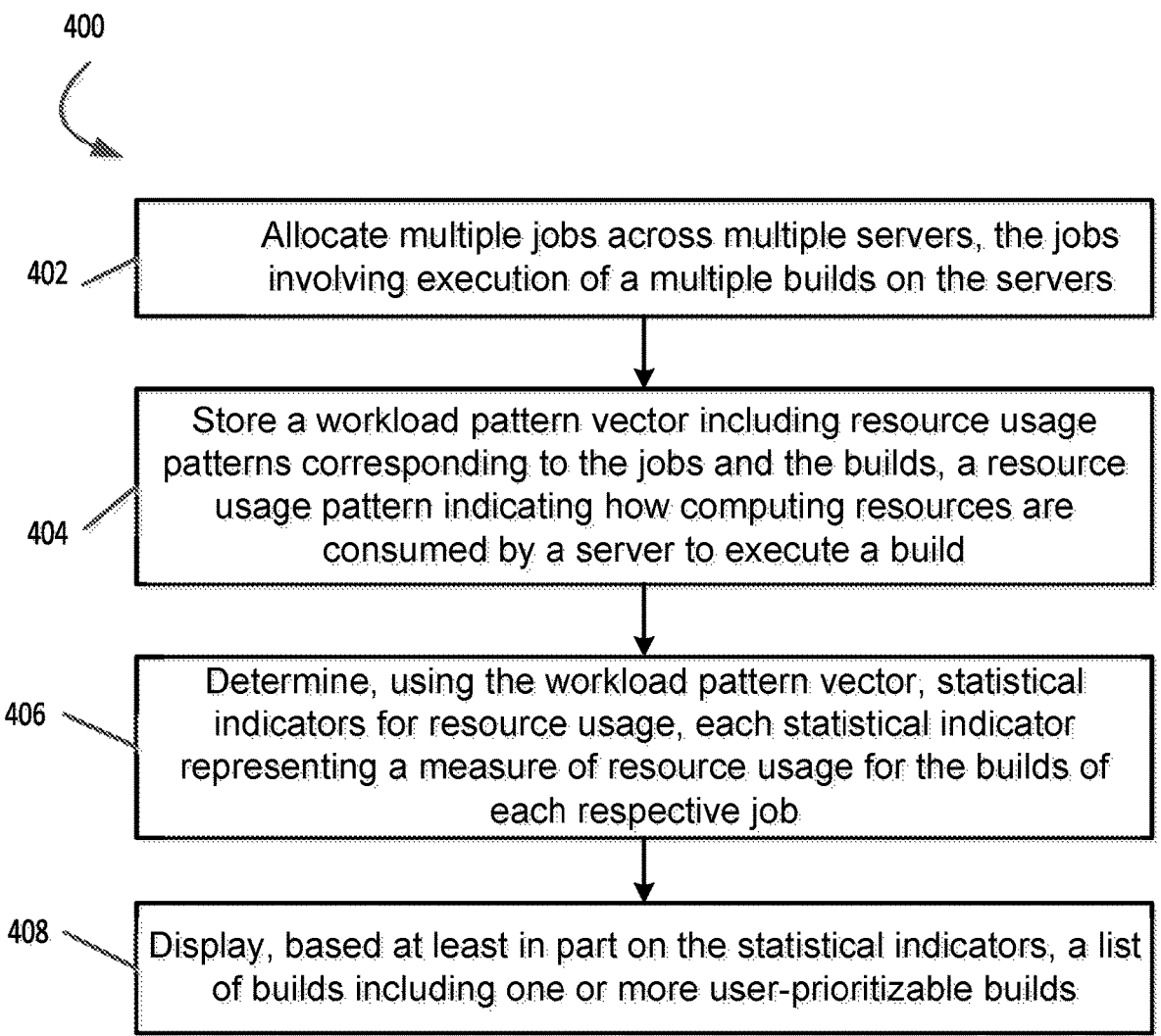
FIG. 4 is a flowchart of an example process for providing priority switching based on resource usage patterns.

FIG. 4 is a flowchart of an example process for providing priority switching based on resource usage patterns. In some examples, a processing device (e.g., processing device 104) can perform one or more of the operations shown in FIG. 4 to provide priority switching based on resource usage patterns. In other examples, the computing device can implement more operations, fewer operations, different operations, or a different order of the operations depicted in FIG. 4. Process 400 of FIG. 4 is described below with reference to components discussed above.

In block 402 of FIG. 4, the processing device 104 allocates multiple jobs across multiple servers such as servers 160a-160c or servers 212. The jobs involving execution of multiple builds. In block 404, the processing device 104 stores a workload pattern vector including resource usage patterns corresponding to the jobs and the builds. A resource usage pattern indicate how computing resources are consumed by a server to execute a build. The workload pattern vector can be stored in memory device 106. In block 406, processing device 104 determines, using the workload pattern vector 168 or 210, statistical indicators for resource usage. Each statistical indicator represents a measure of resource usage for the builds of each respective job. In block 408, processing device 104 displays, based at least in part on the statistical indicator, a list of builds including at least some user-prioritizable builds from among the allocated builds. The list of builds 174 can be displayed on user device 172.

Figure 5:
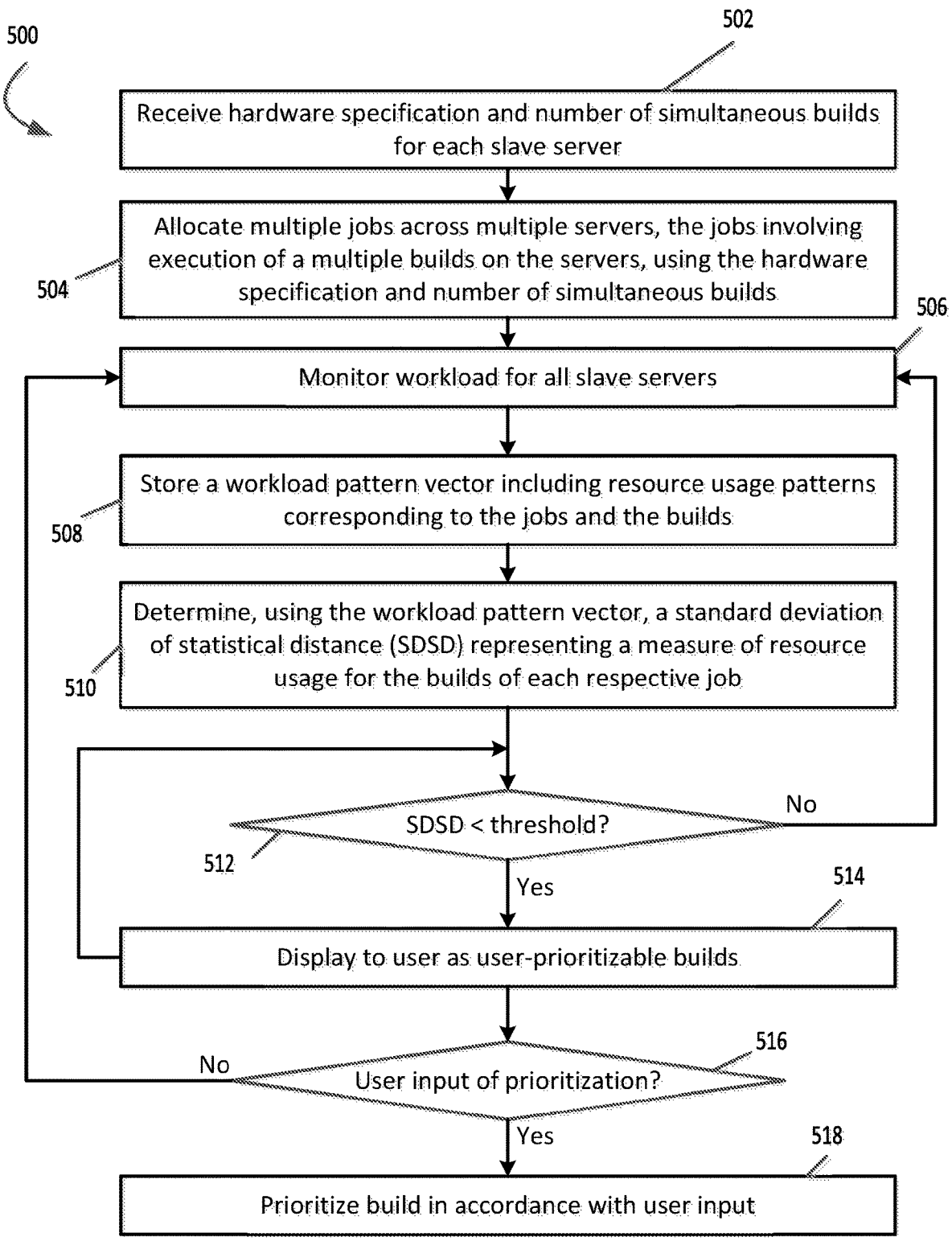
FIG. 5 is a flowchart of another example process for providing priority switching based on resource usage patterns.

As another example, a processing device 104 can perform the operations 500 shown in FIG. 5 to provide priority switching based on resource usage patterns in a CI or CD server environment. In block 502 of FIG. 5, the processing device receives hardware specifications for the slave servers and a number of simultaneous builds permitted on each of the slave servers. The number of slaves required for a job is also determined. These parameters can be retrieved from memory or received through user input. For example, the hardware specification may be a desired hardware specification submitted by the user and the number of slaves to use may also be requested by the user. In block 504, the processing device allocates multiple jobs across multiple servers using hardware specifications and a number of simultaneous builds each slave server can run. The jobs involve execution of multiple builds on the servers. In block 506, the processing device monitors the workload of all slave servers. In block 508, the workload pattern vector is stored. The workload pattern vector includes parameters describing resource usage patterns corresponding to the jobs and the builds as determined in block 506. These parameters may include: (i) workload over time, for example, in terms of central processing unit (CPU) usage; (ii) memory usage; (iii) storage space, (iv) network usage; or (v) any combination of these. The time taken to execute the job that is the subject of the build may also be stored as a parameter.

Still referring to FIG. 5, in block 510 the processing device determines, using the workload pattern vector, a statistical indicator representing a measure of resource usage for the builds of each respective job. In this example, the statistical indicator used is a standard deviation of a median of statistical distance (SDSD) between the resource usage of builds in a set of builds executing each job. This distance can, as examples, be calculated using sparse data derived from the workload pattern vector in part by applying neighborhood components analysis (NCA) or a large margin nearest neighbor (LMNN) classifier. As examples, the set of builds can be the set of all builds, the set of all builds except the earliest build, or the set of all builds except the two earliest builds. An "earlier" build is a build of a job that began running sooner in time. In block 512, the SDSD for each job is compared to a threshold value. If the SDSD is less than a threshold value for a job, current builds of that job are displayed as a user-prioritizable build in block 514. User prioritizable builds, as an example, can be displayed either alone with other builds with appropriate indices for the user to be able to select builds to prioritize or reprioritize. These builds can be displayed as part of a displayed list of builds such as list 174 on user device 172 in FIG. 1. User input can be received in block 516 regarding prioritization one or more builds, and the processing device prioritizes or reprioritizes the one or more builds in response to the user input in block 518.

Optionally, in addition to the above process, a partial run of builds can be undertaken on underutilized slave servers to develop and store additional workload pattern vectors. In this way, resource usage pattern data can be established without the influence of builds owned by other users and this data from the underutilized slave servers can be stored for future evaluation of the accuracy and performance of the system.

Figure 6:
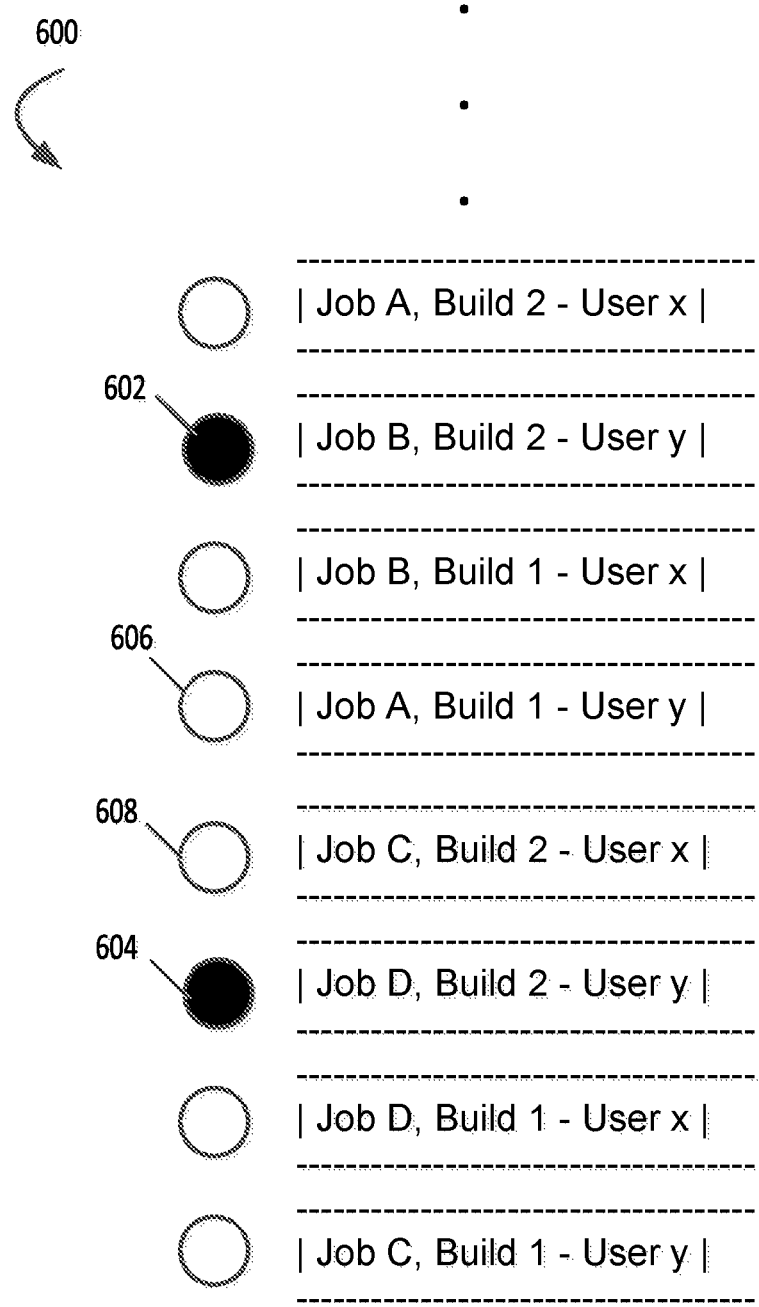
FIG. 6 is an example GUI for priority switching based on resource usage patterns according to some aspects.

FIG. 6 illustrates at least a portion 600 of a list of builds as might be displayed on user device 172 of FIG. 1 in a user interface. Two users, user x and user y, have builds running jobs in the system and this selection is being displayed to user y. Each user has four jobs displayed in this part of the list, job A, B, C, and D, and at least two builds are running each of these jobs. To the left of the listing of builds are indicators that can be highlighted by the processing device in the master server. Indicators 602 and 604 are highlighted, indicating that these builds are prioritizable by user y. By contrast, indicators 606 and 608 are examples of indicators that are not highlighted, and thus the corresponding builds are not user-prioritizable. In the case of indicator 606, job A, build 1 is not user-prioritizable because of the amount of resources being used. In the case of indicator 608, the build is not prioritizable by this user because the build belongs to the other user, user x. In some aspects, user y can click on the indicator or provide some other user input to indicate the intent to reprioritize one of the highlighted builds, which would lead to a menu with various options to be selected, such as cancel the build or exchange it for the other highlighted build in terms of priority of the two jobs. The processing device in the master server would then prioritize in accordance with user y's input.

The list of builds shown in FIG. 6 is just an example. A system like that described herein might only display the user's builds to a specific user or might only display the particular user's prioritizable builds. At least some of the examples in this disclosure are applicable not only to an enterprise distributing builds internally, but also to a third-party provider of distributed computing services. With such a third-party provider, one user may not be presented with another user's builds as part of a list of builds to be displayed.

A third-party provider's system may be able to display builds and jobs based on instances and task types. As examples, instances can include general purpose instances, compute optimized instances, memory optimized instances and storage optimized instances. Task types can be defined along the lines of services provided by the third-party provider. As examples, these task types can include user code uploaded to function as a service container, a machine learning service with a known pattern, and an IoT analytics service. A build in such a case is displayed as an instance, but can be displayed as enabled for reprioritization in a user interface similar to that shown in FIG. 6.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "above,"

"below," when referring to numerical comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
allocating a plurality of jobs across a plurality of servers, the plurality of jobs involving execution of a plurality of builds on the plurality of servers;
storing a workload pattern vector that includes a plurality of resource usage patterns corresponding to the plurality of jobs and the plurality of builds, each resource usage pattern indicating how computing resources are consumed by a server to execute a respective build from among the plurality of builds;
determining, using the workload pattern vector, a plurality of statistical indicators corresponding to the plurality of jobs, each respective statistical indicator representing a statistical measure of resource usage for the plurality of builds for a respective job among the plurality of jobs; and
displaying, based at least in part on the plurality of statistical indicators, a list of builds including one or more user-prioritizable builds from among the plurality of builds.

2. The system of claim 1 wherein the statistical indicator comprises a standard deviation of a median of statistical distance between the resource usage patterns of at least one set of builds for each job.

3. The system of claim 2 wherein the at least one set of builds comprises at least one of, all builds, all builds except an earliest build, or all builds except two earliest builds.

4. The system of claim 2 wherein the list of builds is displayed at least in part by comparing the standard deviation of the median of statistical distance to a threshold value.

5. The system of claim 2 wherein the median of statistical distance is determined based on sparse data from the workload pattern vector.

6. The system of claim 1 wherein the operations further comprise:
receiving user input directed to prioritizing at least one of the user-prioritizable builds; and
prioritizing the at least one of the user-prioritizable builds in response to the user input.

7. The system of claim 1 wherein the plurality of builds is allocated across the plurality of servers based at least in part on a hardware specification for the plurality of servers and a number of simultaneous builds permitted on each of the plurality of servers.

8. A method comprising:
allocating, by a processing device, a plurality of jobs across a plurality of servers, the plurality of jobs involving execution of a plurality of builds on the plurality of servers;
storing, in a storage device, a workload pattern vector that includes a plurality of resource usage patterns corresponding to the plurality of jobs and the plurality of builds, each resource usage pattern indicating how computing resources are consumed by a server to execute a respective build from among the plurality of builds;
determining, by the processing device, using the workload pattern vector, a plurality of statistical indicators corresponding to the plurality of jobs, each respective statistical indicator representing a statistical measure of resource usage for the plurality of builds for a respective job among the plurality of jobs; and
displaying, by the processing device, based at least in part on the plurality of statistical indicators, a list of builds including one or more user-prioritizable builds from among the plurality of builds.

9. The method of claim 8 wherein the statistical indicator comprises a standard deviation of a median of statistical distance between the resource usage of at least one set of builds for each job.

10. The method of claim 9 wherein the at least one set of builds comprises at least one of, all builds, all builds except an earliest build, or all builds except two earliest builds.

11. The method of claim 9 wherein the list of builds is displayed at least in part by comparing the standard deviation of the median of statistical distance to a threshold value.

12. The method of claim 9 wherein the median of statistical distance is determined based on sparse data from the workload pattern vector.

13. The method of claim 8 further comprising:
receiving user input directed to prioritizing at least one of the user-prioritizable builds; and
prioritizing the at least one of the user-prioritizable builds in response to the user input.

14. The method of claim 8 wherein the plurality of builds is allocated across the plurality of servers based at least in part on a hardware specification for the plurality of servers and a number of simultaneous builds permitted on each of the plurality of servers.

15. A non-transitory computer-readable medium comprising program code that is executable by a processing device for causing the processing device to:
allocate a plurality of jobs across a plurality of servers, the plurality of jobs involving execution of a plurality of builds on the plurality of servers;
store a workload pattern vector that includes a plurality of resource usage patterns corresponding to the plurality of jobs and the plurality of builds, each resource usage pattern indicating how computing resources are consumed by a server to execute a respective build from among the plurality of builds;
determine, using the workload pattern vector, a plurality of statistical indicators corresponding to the plurality of jobs, each respective statistical indicator representing a statistical measure of resource usage for the plurality of builds for a respective job among the plurality of jobs; and
display, based at least in part on the plurality of statistical indicators, a list of builds including one or more user-prioritizable builds from among the plurality of builds.

16. The non-transitory computer-readable medium of claim 15 wherein the statistical indicator comprises a standard deviation of a median of statistical distance between the resource usage of at least one set of builds for each job.

17. The non-transitory computer-readable medium of claim 16 wherein the list of builds is displayed at least in part by comparing the standard deviation of the median of statistical distance to a threshold value.

18. The non-transitory computer-readable medium of claim 16 wherein the median of the statistical distance is determined based on sparse data from the workload pattern vector.

19. The non-transitory computer-readable medium of claim 15 further comprising program code that is executable by the processing device for causing the processing device to:
   receive user input directed to prioritizing at least one of the user-prioritizable builds; and
   prioritize the at least one of the user-prioritizable builds in response to the user input.

20. The non-transitory computer-readable medium of claim 15 wherein the plurality of builds is allocated across the plurality of servers based at least in part on a hardware specification for the plurality of servers and a number of simultaneous builds permitted on each of the plurality of servers.

* * * * *